May 17, 1938.    P. J. FITZGERALD    2,117,841
THICKNESS INDICATOR FOR PAPER MAKING MACHINES
Filed Sept. 19, 1935    2 Sheets-Sheet 1
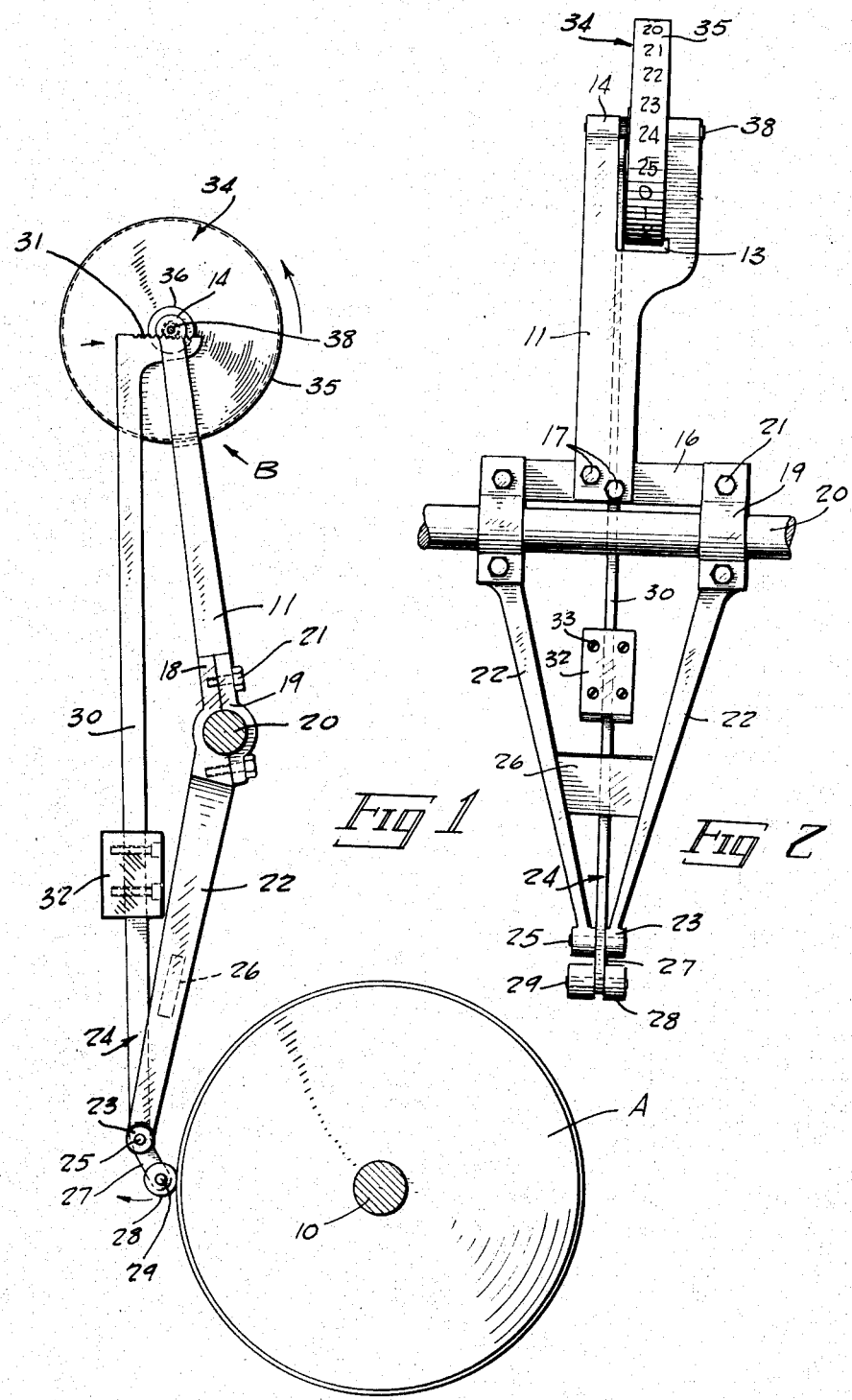

May 17, 1938.     P. J. FITZGERALD     2,117,841
THICKNESS INDICATOR FOR PAPER MAKING MACHINES
Filed Sept. 19, 1935     2 Sheets-Sheet 2
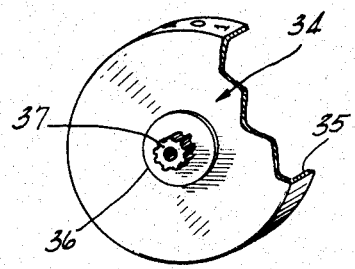
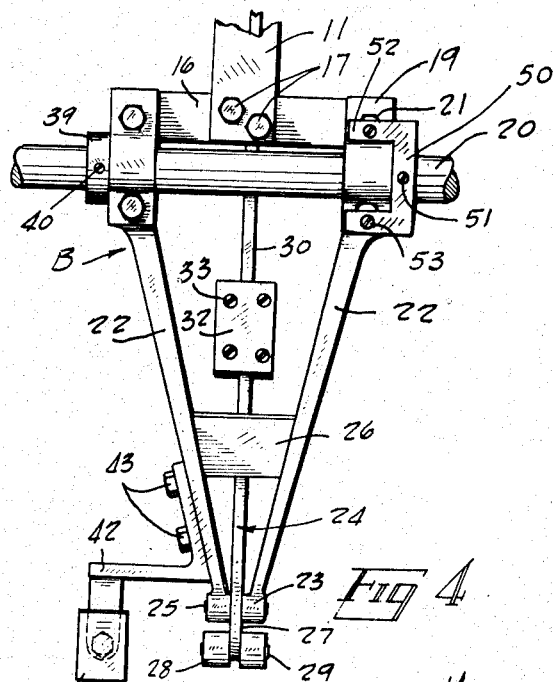
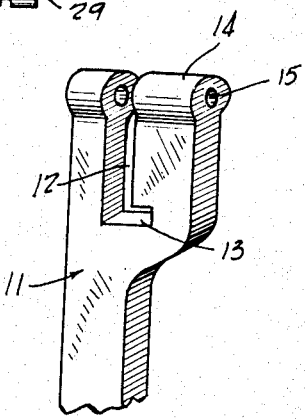
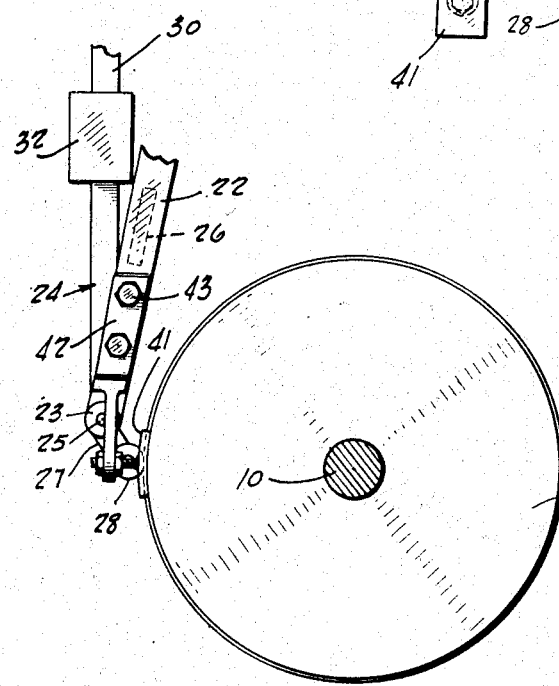
INVENTOR:
PATRICK J. FITZGERALD
BY
Joshua R. H. Potts
ATTORNEY Patented May 17, 1938

2,117,841

UNITED STATES PATENT OFFICE 2,117,841

THICKNESS INDICATOR FOR PAPER MAKING MACHINES

Patrick J. Fitzgerald, Torrington, Conn., assignor to The Fitzgerald Manufacturing Company, Torrington, Conn., a corporation of Connecticut Application September 19, 1935, Serial No. 41,194

6 Claims. (Cl. 33—172)

This invention deals with paper making machines, and is concerned primarily with apparatus for determining the thickness of material as it is being manufactured.

At the present time in the paper making art it is common practice to build up on a depositing drum, material such as cardboard, paper, asbestos in sheet form, and the like, and this invention recognizes the need for accurately indicating at all times the thickness of the material as it is being built up on the depositing drum.

Accordingly, this invention has in view as an important object the provision of apparatus for indicating the thickness of paper and like materials during their process of manufacture.

In carrying out this objective in a practical embodiment, a condition inherent in this art makes itself present, which condition is the fact that the material being made is always comparatively thin, that is, relative changes in its thickness involve very small lineal distances, and, it therefore, becomes important to provide an indicating apparatus which involves the amplification of variations in the thickness of the material by moving parts of the indicating apparatus so that the variations may be accurately determined.

A more detailed object of the invention, therefore, is to provide in a paper making machine, indicating apparatus which includes an indicating part which is movable over a lineal distance many times greater than the actual distance covered by changes in the thickness of the material.

A further object of the invention is to provide indicating apparatus for gauging the thickness of the material being manufactured which includes roller means for engaging the surface being built up, and instrumentalities for yieldably maintaining the roller means in engagement with the said surface.

A somewhat more refined object of the invention is to render said yielding means adjustable.

Inasmuch as this invention contemplates indicating apparatus which is characterized by having roller means engage the surface being built up, and the indicating apparatus function by indicating variations in the distance between the roller surfaces and the surface of the depositing drum, a further object of the invention is to provide indicating apparatus which is movable with the drum so that changes in the position of the depositing drum will not interfere with the registering effects of the indicating apparatus.

Other more detailed objects and advantages will in part become apparent and in part be hereinafter stated as the description of the invention proceeds.

The invention, therefore, comprises a frame which may be swingably mounted, a lever carried by the frame, roller means at one end adapted to engage the surface of material being built up on a depositing drum, and means for yieldably maintaining the roller means in engagement with the said surface. When the frame is pivotally mounted, instrumentalities are provided for rendering the latter swingable with changes in the effective position of the drum. An indicating dial is operatively associated with the end of the lever opposite to that carried by the roller means.

For a full and more complete understanding of the invention, reference may be had to the following description and accompanying drawings wherein:

Figure 1 is a view in side elevation of indicating apparatus made in accordance with the precepts of this invention, Figure 2 is a front elevational showing with the drum removed, Figure 3 is a fragmentary side view of a modified form, while Figure 4 is a front view with the drum removed, of the form shown at Figure 3, Figure 5 is an enlarged detail perspective of a portion of the framework, and Figure 6 is another detail perspective showing of the indicating dial with parts broken away and shown in section.

Referring now to the drawings, wherein like reference characters denote corresponding parts, a depositing drum is shown somewhat diagrammatically in Figures 1 and 3, and is referred to generally by the reference character A. This drum is mounted for rotative operation on a shaft designated 10, in the usual manner, and as it is rotated, paper, cardboard or other stock is deposited thereon as it is being built up to provide the ultimate product.

In order to accurately indicate at all times the thickness of the material on the drum A, I propose to avail of indicating apparatus, which is referred to generally by the reference character B. This apparatus comprises a framework consisting of an upper arm 11, the extremity of which is enlarged and bifurcated, as shown in Figure 5, to provide a slot 12 terminating in a horizontally extending portion 13. The end edge of this member 11 is rounded, as shown at 14, and this rounded portion is bored to provide an opening 15 which extends across the entire bifurcated structure.

At its lower extremity the arm 11 is secured to a cross arm 16, in any preferred manner, as by bolts 17. The cross arm 16 is connected at each end preferably integrally, to clamping parts 18, each of the portions 18 constituting one half of a clamp.

Clamping members 19 cooperate with the portions 18 to rigidly clamp the frame to a cross arm 20, which is shown as broken away, and which is included in the framework of the machine. Any suitable connecting means may be used to join the clamping parts 18 and 19, such as the screw members designated 21.

Extending downwardly from the lower ends of the portions 18 are a pair of converging arms 22 which terminate in rounded extremities 23 that are slightly spaced apart to receive therebetween a lever 24. The latter is provided with a pivotal opening, as are the rounded extremities 23, and a pivot pin 25 extends through these aligned openings.

Intermediate the extremities 23 in the clamping portions 18 bracing means in the form of a cross member 26 may be included in the structure. This cross member serves to maintain the converging arms 22 in their proper relative positions.

The lever 24 is of a bell crank formation, and has a short arm 27 which carries roller means in the form of a pair of rollers 28, one being disposed on each side of the arm 27. These rollers are pivotally mounted, as by a pin 29, and are designed for engagement with either the surface of the drum A, or the material being built up thereon.

The lever 24 has a long arm, referred to as 30, and the extremity thereof is turned over at an angle and formed with a series of teeth constituting a rack 31. It is notable that the lever 24 is so disposed that it is inclined slightly to the vertical, and a weight designated 32 is slidably mounted on the long arm 30 and maintained in any adjusted position thereon by screw members 33. This weight is effective to maintain the rollers 28 in engagement with the drum A.

Referring now more particularly to Figure 6, an indicating dial is shown as being of a cup-like formation, and is referred to by the reference character 34. This dial 34 has a cylindrical flange 35 which may be marked on its outer surface to provide suitable indicia. The dial 34 is provided with a hub member 36 that carries a pinion 37, the latter being designed for operative engagement with the rack 31.

The dial 34 is assembled in the bifurcated extremity of the arm 11 with the cylindrical flange 35 being received in the cross slot 13. A pin 38 extends through the opening 15 and corresponding openings formed in the pinion 37 and the hub 36. This pin serves as a pivotal mounting for the indicating dial and associated parts.

The operation of the above described mechanism is obvious. However, it may be briefly outlined by noting that as the material is built up on the drum A, the rollers 28 will be urged in the direction of the arrow at the bottom of Figure 1 against the influence of the weight 32. This outward movement of the rollers 28 causes an inward movement of the rack 31, as indicated by the arrow at the top of Figure 1.

This movement of the rack causes rotation of the pinion 37 and corresponding movement of the cylindrical flange 35 of the dial 34. The framework of the machine may be provided with some marking means to cooperate with the indicia on the flange 35, which marking means need only constitute some stationary point. It is evident that a very slight movement on the part of the rollers 28 will be multiplied many times by the long arm 30, the rack and pinion assembly 31 and 37, and the comparatively large radius of the dial 34 to impart a large amount of lineal movement to the flange 35.

In the form of the invention shown in Figures 3 and 4, the framework B is not clamped in the cross arm 20, but is swingably mounted thereon, being held against longitudinal movement on the cross arm 20 by a collar 39 which is adjustably mounted at one end on the cross arm 20 as by a set screw shown at 40. At the other end a collar 50 is adjustably mounted on the shaft 20 as by a set screw 51 and this collar 50 carries arms 52 in which are threaded set screws 53. These arms 52 extend over the part 19 and serve to limit rocking movement of the frame B. The limits between which this rocking may take place can be varied by adjusting the set screws 53.

A drum follower 41 has an arcuate surface and engages the drum A at a point where the material is not being built up thereon. This follower 41 is connected by a bracket designated 42 to one of the arms 22, as by a bolt shown at 43. It is noted that the bracket 42 serves to mount the follower 41 in spaced relation from the rollers 28. With this arrangement, any movement of the drum itself will be accompanied by a movement of the frame B so that there is no relative movement between the lever 24 and the frame to affect the indicating dial 34. However, as the material is built up, this relative movement is effective to cause the indicating dial to function in the manner above described.

While preferred specific embodiments of the invention are hereinbefore set forth, it is to be understood that I am not to be limited to the exact mechanisms illustrated and described, as various modifications of these details may be provided in putting the invention into practice, within the purview of the appended claims.

I claim:—

1. Indicating apparatus of the class described, comprising a frame, a lever pivotally carried by the frame, roller means at one end of said lever, a weight on said lever for yieldably urging the roller means in one direction, said weight being disposed on the side of the pivotal mounting of the lever opposite from the roller an indicating dial carried by the frame, and operative driving connections between the indicating dial and the end of said lever opposite from the roller-carrying means.

2. Indicating apparatus of the character described comprising a frame consisting of an upper arm and a pair of converging lower arms, a bell crank lever pivotally mounted between the lower arms, an indicating dial carried by the upper arm, and driving connections between the bell crank lever and the indicating dial.

3. Indicating apparatus of the character described comprising a frame consisting of an upper arm and a pair of converging lower arms, a bell crank lever pivotally mounted between the lower arms, the upper arm being bifurcated, an indicating dial having a cylindrical flange mounted in the bifurcation of the upper arm, indicia on the said flange, and driving connections between the bell crank lever and the indicating dial.

4. Indicating apparatus of the character described comprising a frame consisting of an upper arm and a pair of converging lower arms, a bell crank lever pivotally mounted between the lower arms, the upper arm being bifurcated, an indicating dial having a cylindrical flange mounted in the bifurcation of the upper arm, indicia on the said flange, driving connections between the bell crank lever and the indicating dial, said connections including a pinion carried by the dial, and a rack at the upper end of the bell crank lever engaging the pinion.

5. Indicating apparatus of the class described comprising a shaft, a frame pivotally mounted on the shaft for rocking movement thereon, means for limiting the rocking movement of the frame consisting of a collar carried by the shaft and having arms extending over the frame, and adjustable set screws in said arms adapted to engage the frame, a lever carried by the frame, roller means at one end of said lever, an indicating dial carried by the frame, and driving connections between the indicating dial and the end of the said lever opposite from the roller means.

6. Indicating apparatus of the class described, comprising a frame, a lever pivotally carried by the frame, roller means at one end of said lever, weight means for yieldably urging the roller means in one direction, said weight means being disposed on the side of the pivotal mounting of the lever opposite from the roller, said weight means being adjustable along the lever, an indicating dial carried by the frame, and operative driving connections between the indicating dial and the end of said lever opposite from the roller-carrying means.

PATRICK J. FITZGERALD.